United States Patent [19]

Wolfe

[11] Patent Number: 4,836,342
[45] Date of Patent: Jun. 6, 1989

[54] CONTROLLABLE FLUID DAMPER ASSEMBLY

[75] Inventor: Paul T. Wolfe, Apex, N.C.
[73] Assignee: Lord Corporation, Erie, Pa.
[21] Appl. No.: 83,701
[22] Filed: Aug. 7, 1987
[51] Int. Cl.[4] ............................................. F16F 9/34
[52] U.S. Cl. ............................ 188/319; 188/322.15; 251/282; 251/319; 267/127; 280/714
[58] Field of Search ................... 188/319, 322.15, 282, 188/317, 320, 299; 251/282, 319; 280/714; 267/127

[56] References Cited

U.S. PATENT DOCUMENTS

| | | |
|---|---|---|
| 1,205,433 | 11/1916 | Christman . |
| 2,235,488 | 3/1941 | Mercier ............................ 188/320 X |
| 3,063,518 | 11/1962 | Stark .................................... 188/88 |
| 3,420,341 | 1/1969 | Keehn, II ............................. 188/88 |
| 3,807,678 | 4/1974 | Karnopp et al. .................. 248/358 R |
| 3,826,343 | 7/1974 | Heymann ............................ 188/282 |
| 3,892,384 | 7/1975 | Meyers .............................. 251/282 |
| 4,463,839 | 8/1984 | Ashiba .............................. 188/299 |
| 4,491,207 | 1/1985 | Boonchanta et al. ............... 188/299 |
| 4,530,425 | 7/1985 | Veaux et al. ....................... 188/320 |
| 4,620,619 | 11/1986 | Emura et al. ...................... 188/319 |
| 4,635,765 | 1/1987 | Schmidt ............................. 188/299 |
| 4,666,126 | 5/1987 | Tujimura et al. .................. 251/282 |
| 4,696,489 | 9/1987 | Fujishiro et al. .................. 280/707 |

FOREIGN PATENT DOCUMENTS 1336186 7/1963 France ............................. 188/320
2164120 3/1986 United Kingdom .

Primary Examiner—George E. A. Halvosa
Attorney, Agent, or Firm—Bell, Seltzer, Park & Gibson

[57] ABSTRACT

The piston of the damper, which is of the piston-and-cylinder type, has therein at least one fluid passageway, a pair of fluid inlet/outlet ports opening from one end of the piston and communicating with the passageway at spaced locations along its length, an outlet/inlet port opening from the opposite end of the piston and communicating with the passageway at a location along its length intermediate the locations of the inlet/outlet ports, and a valve element mounted within the passageway for movement transversely thereof between an open-valve position, where the valve element permits relatively free flow of fluid through the passageway, and a closed-valve position wherein the valve element obstructs the fluid flow. The valve element has at least one pressure-equalizing opening extending therethrough and is substantially pressure balanced in a plurality of orthogonal directions. The valve element is driven by an actuator which may be and preferably is a linear actuator of a springless single acting type.

7 Claims, 3 Drawing Sheets

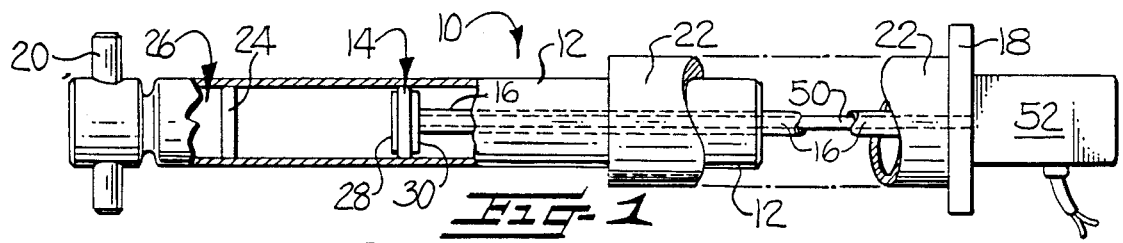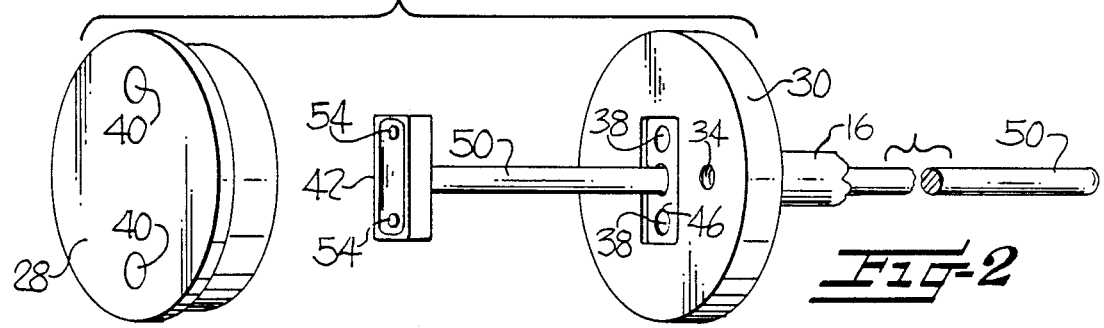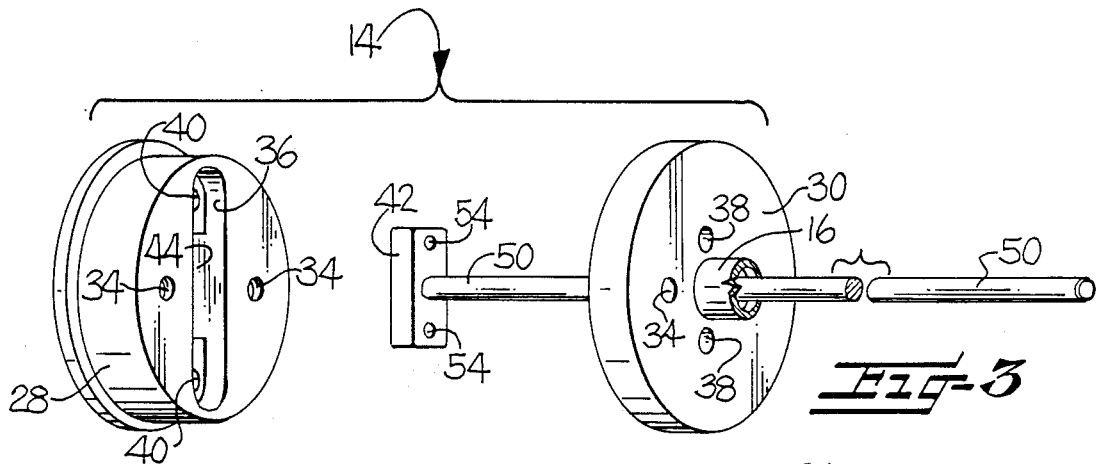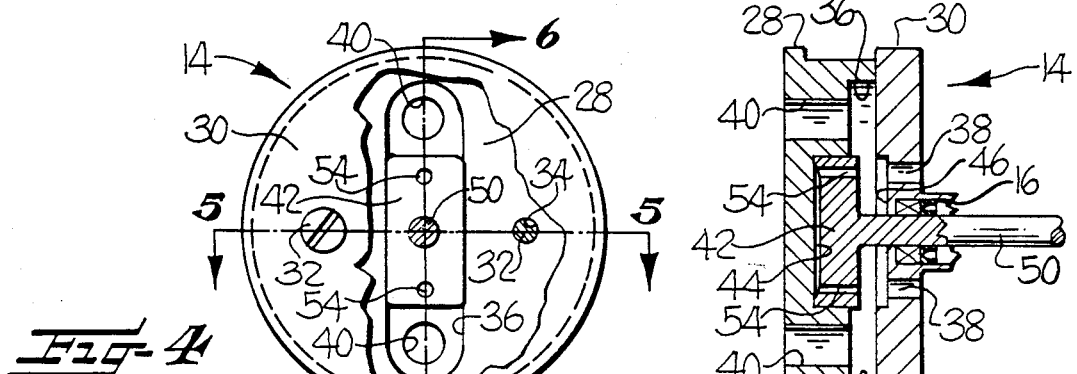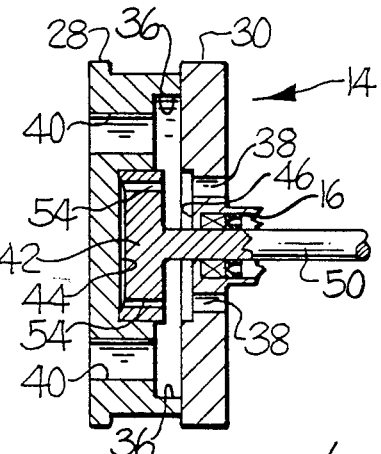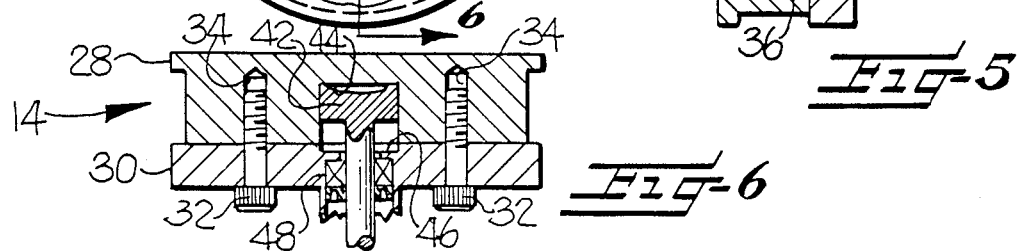

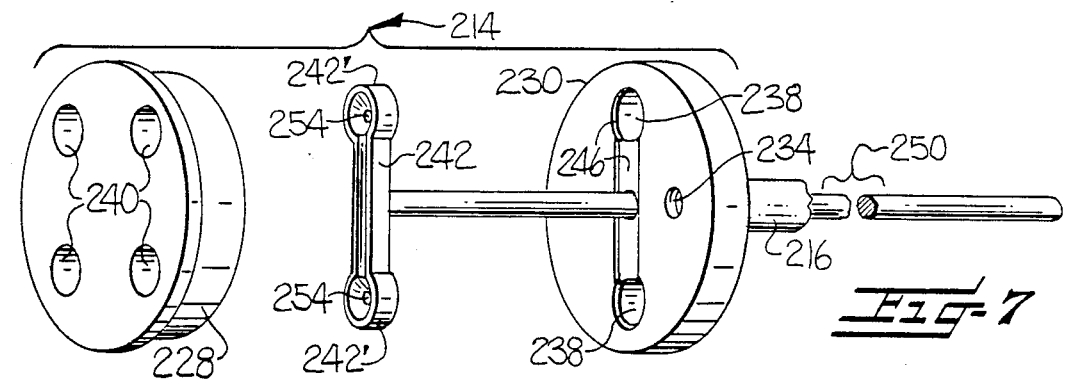
Fig-7
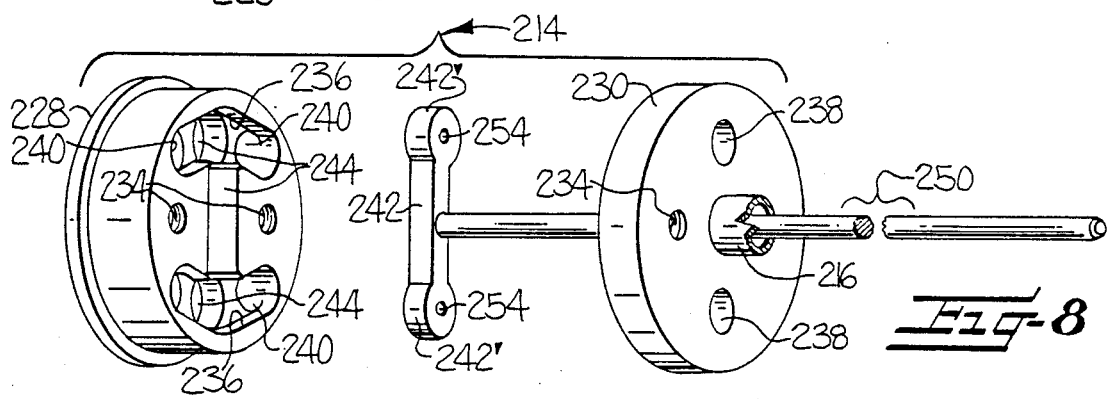
Fig-8
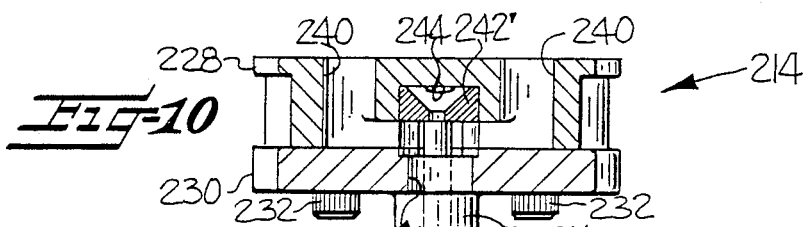
Fig-10
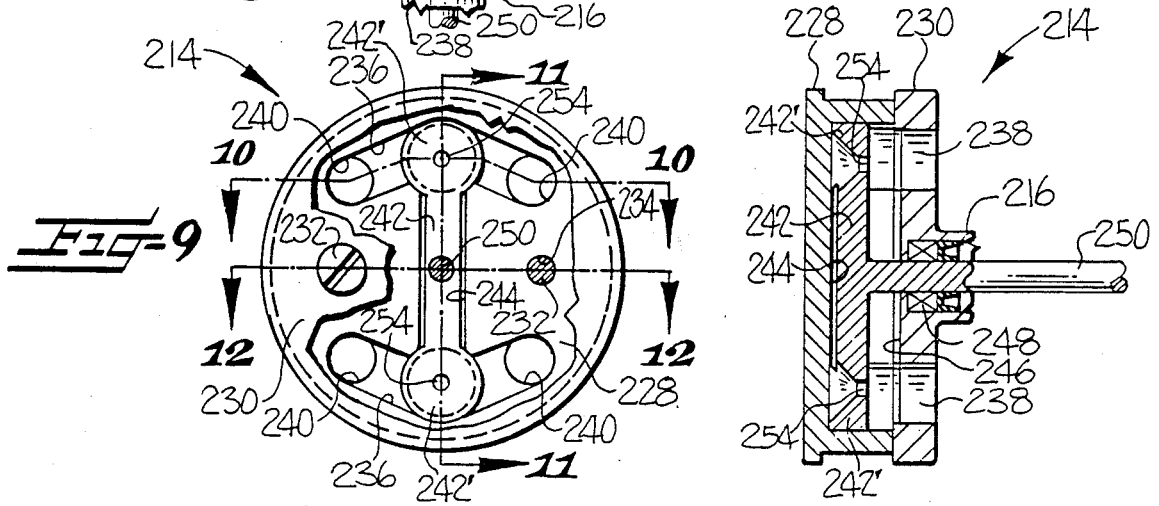
Fig-9
Fig-11
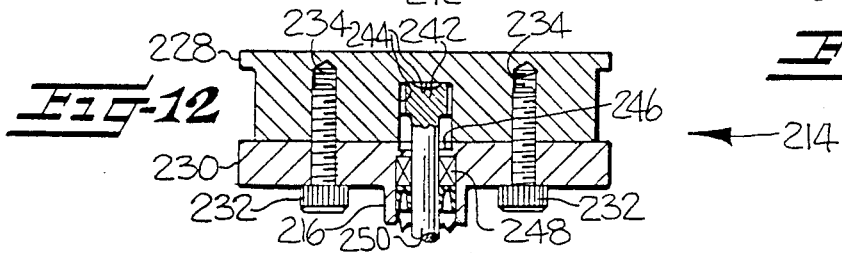
Fig-12

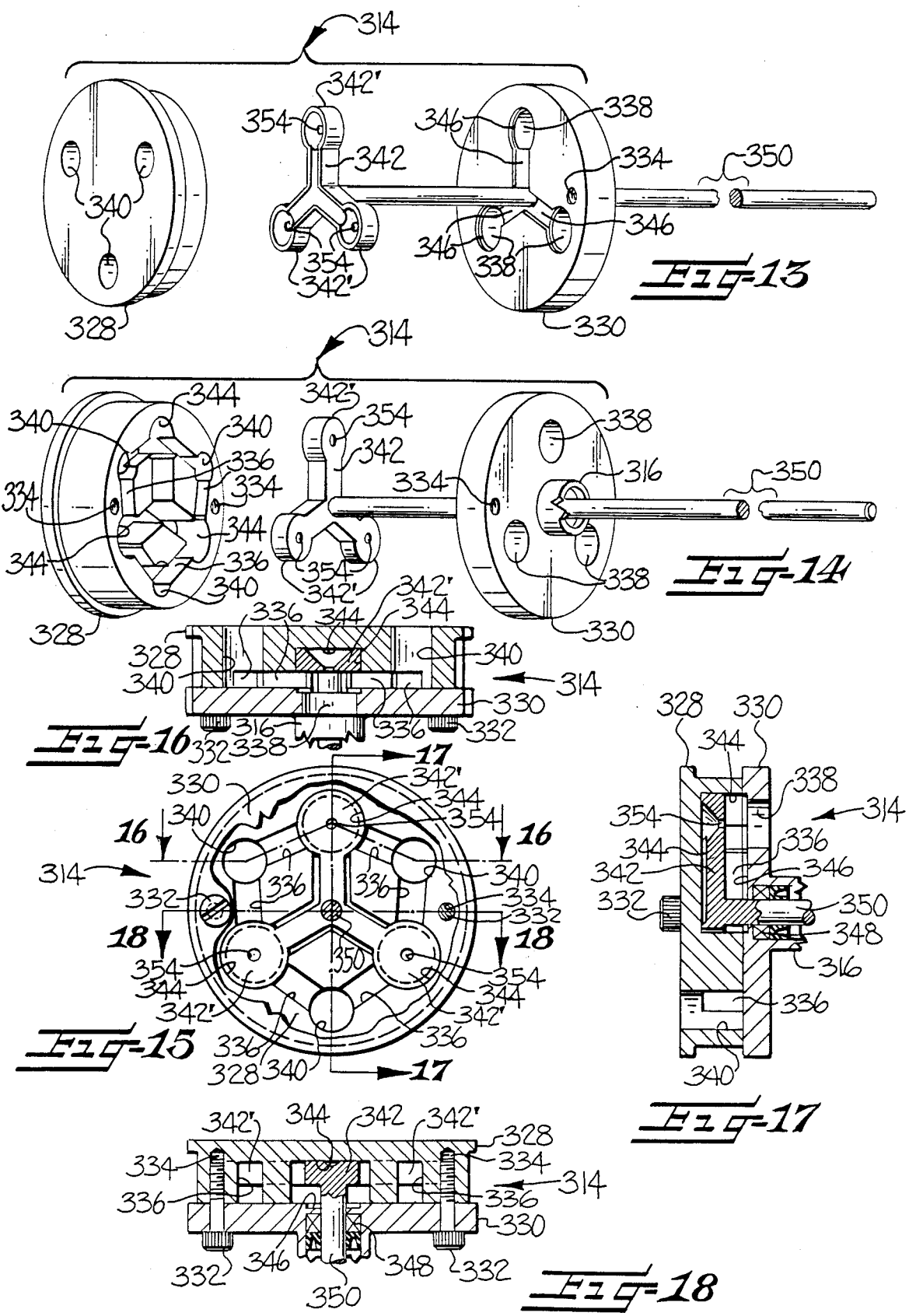

CONTROLLABLE FLUID DAMPER ASSEMBLY

This invention relates to fluid damper assemblies of the piston-and-cylinder type that have controllable means for changing the damping coefficient of the dampers during operation thereof. The invention more specifically relates to such an assembly in which the controllable means includes a valve within the piston of the assembly.

BACKGROUND OF THE INVENTION

Damper assemblies having controlled valves that are associated with their piston components, and that may be used to change the damping coefficients of the dampers, are known: see, e.g., U.S. Pat. Nos. 4,635,765, 4,620,619, 4,463,839, 3,420,341, 3,063,518, 1,205,433, and UK application publication No. 2,164,120A. When employed in the suspension of an automobile or similar vehicle, such dampers permit the "stiffness" of the suspension to be adjusted for different driving conditions. For example, if the vehicle is traveling at high speed and/or over a relatively rough road surface, the damping coefficient of the assemblies may be increased so as to provide increased vehicle stability and passenger comfort. Similarly, if the vehicle is traveling over a relatively smooth road surface at a relatively low speed, decrease of the damping coefficient of the assemblies might be desirable and could be effected.

The foregoing and many other conventional uses of controllable damper assemblies do not require especially rapid or frequent operation of their valve components. However, rapid and frequent valve operation is required in certain utilizations, such as when a damper of the type in question is to be employed for implementation of a vibration control policy similar to that disclosed in U.S. Pat. Nos. 3,807,678 and 4,491,207. The valve in the piston of a damper used for such purpose must be capable of very rapid and substantially continuous operation over extended periods of time even when there is a large pressure differential across the piston. When the valve is in its fully open position, it additionally should then permit a large flow in either direction through the piston. The valve desirably should also be operable by inexpensive means, such as a single or double acting linear actuator of the solenoid or other common type.

SUMMARY OF THE INVENTION

The present invention provides, in the piston of a damper assembly of the previously described type, valve means that is exceedingly fast acting even when a large pressure differential exists across the piston, is lightweight and durable, provides a large fluid flow area when in its open condition, and is operable by an inexpensive linear actuator. The valve includes at least one fluid passageway within the piston, a pair of fluid inlet/outlet ports opening from one end of the piston and communicating with the passageway at spaced locations along its length, an outlet/inlet port opening from the opposite end of the piston and communicating with the passageway at a location along its length intermediate the locations of the inlet/outlet ports, and a valve element mounted within the passageway for movement transversely thereof between an open-valve position, wherein the valve element permits relatively free flow of fluid through the aforesaid passageway, and a closed-valve position wherein the valve element obstructs the fluid flow. The valve element has at least one pressure-equalizing opening extending therethrough and is substantially pressure balanced in a plurality of orthogonal directions. The valve means is operable by an actuator which may be and preferably is a linear actuator of a springless single acting type.

DESCRIPTION OF THE DRAWINGS

Other features of the invention will be apparent from the following description of illustrative embodiments thereof, which should be read in conjunction with the accompanying drawings, in which:

FIG. 1 is an elevational view of a fluid damper assembly, partially broken away to reveal interior construction, in accordance with the invention;

FIG. 2 is an enlarged exploded left end perspective view of piston, valve and rod components, the rod being broken away intermediate its length, of the damper assembly;

FIG. 3 is a right end view similar to FIG. 2 of the same components;

FIG. 4 is an enlarged right end elevational view, partially broken away to reveal interior details of the assembled piston, rod and valve components shown in FIGS. 2 and 3;

FIGS. 5 and 6 are sectional views taken substantially along the respective lines 5—5 and 6—6 through the assembled components of FIG. 4, showing the valve element in an open position;

FIGS. 7 and 8 are respective left and right end exploded perspective views of piston, valve and rod components in accordance with a second embodiment of the invention;

FIG. 9 is an enlarged right end elevational view, partially broken away to reveal interior details, of the assembled piston, rod and valve components shown in FIGS. 7 and 8;

FIGS. 10, 11 and 12 are sectional views taken substantially along the respective lines 10—10, 11—11 and 12—12 of FIG. 9 through the assembled components of FIG. 9;

FIGS. 13 and 14 are respective left and right end perspective exploded views of piston, valve and rod components in accordance with a third embodiment of the invention;

FIG. 15 is an enlarged right end elevational view, partially broken away to reveal interior details, of the assembled piston, rod and valve components of the third embodiment; and FIGS. 16, 17 and 18 are sectional views taken substantially along the respective lines 16—16, 17—17 and 18—18 of FIG. 15.

DESCRIPTION OF THE ILLUSTRATED EMBODIMENTS

The numeral 10 in FIG. 1 designates a damper assembly having an elongate cylinder component 12, a piston component 14 located within and movable axially relative to cylinder 12, and a hollow rod component 16 connected to piston 14 and extending from one end (the right end, as viewed in FIG. 1) of cylinder 12. Pins or other suitable connectors 18, 20 respectively affixed to the outer end of rod 16 and to the distal end of cylinder 12 are adapted to secure assembly 10 to relatively movable members (not shown), such as the frame and body components of a vehicle or the like, between which the transmission of shocks, vibrations or similar motions is to be controlled. A cylindrical shroud 22 carried by pin 18 extends therefrom in concentric encircling relationship to rod 16 for the purpose of shielding the rod from debris, moisture and the like during use of assembly 10. A floating piston or diaphragm member 24 is mounted within cylinder 12 in spaced adjacent relationship to its closed end, and defines therewith a variable-volume accumulator 26 that contains pressurized air or similar fluid. The remainder of cylinder 10 is filled with "working" fluid, which normally would be hydraulic fluid of a suitable type and viscosity. Due to the presence of rod 16 on one end only of piston 14, the amount of hydraulic fluid displaced during extension of assembly 10 is different from that displaced during retraction. Accumulator 26 compensates in a known manner for such differential displacement and, when the assembly 10 is of the so-called "high-pressure" type, maintains the hydraulic fluid within cylinder 10 under positive pressure at all times.

Referring now primarily to FIGS. 2-6 of the drawings, piston 14 of assembly 10 is comprised of two generally cylindrical sections 28, 30 secured together in abutting coaxial relationship by bolts 32 that extend through aligned screw-receiving bores 34. The piston contains valve means that includes an elongate fluid passageway 36, at least one and illustratively two inlet/outlet ports 38, a pair of outlet/inlet ports 40, a movable valve element 42, and a pair of recessed seats 44, 46 that are adapted to closely receive element 42. The designation "inlet/outlet" and "outlet/inlet" indicates that both sets of ports 38, 40 function at certain times as inlets and at other times as outlets, and that when one set of the ports (e.g., ports 38) are functioning as inlets the other set of ports (e.g., ports 40) are functioning as outlets. Passageway 36 extends radially outwardly in opposite directions from the central axis of assembly 10 and piston 14, and terminates in spaced adjacent relationship to the cylindrical side wall of the piston. Ports 40 are spaced from each other adjacent opposite end portions of passageway 36, and extend from the passageway through piston section 28 and the left (as viewed in the drawings) end of piston 14. Ports 38 extend through and open inwardly from piston section 30 at locations upon opposite sides of the central axis of piston 14, and communicate with passageway 36 at locations intermediate the length thereof and between the locations of passageways 40. Valve seats 44, 46 are located in confronting relationship to each other upon opposite sides of the central portion of passageway 36, and communicate therewith, valve element 42 is disposed in the central portion of passageway 36 between and in alignment with seats 44, 46. The inner ends of the ports 38 of piston section 30 are within the seat 46 of such piston section, but the inner ends of the ports 40 of piston section 28 are spaced from the seat 44 of section 28. The width and length dimensions of seats 44, 46 exceed, by a preselected small amount, the corresponding dimensions of the valve element 42 adapted to be received therein. The surface of element 42 that confronts the bottom of seat 44 preferably is slightly concave or recessed, as is indicated in FIGS. 5 and 6 of the drawings.

Valve element 42 is supported by a support rod 50 that extends therefrom through bearing and seal means 48 within a central opening of piston section 30, and then through the hollow piston rod 16 of assembly 10 to a solenoid or other linear actuator 52 supported by pin 18 or some other suitable support means provided adjacent the outer end of rod 16, valve element 42 is movable axially of assembly 10 between a valve-open position and a valve-closed position. In its valve-open position, illustrated in FIGS. 5 and 6, valve element 42 is received within seat 44 and is spaced from seat 46. Since valve element 42 does not then significantly obstruct the same, fluid can flow substantially freely through piston 14 via ports 38, 40 and passageway 36, and the damping coefficient of assembly 10 is then relatively small (ideally zero). When in its closed-valve position (not shown in the drawings, but to the right of its position illustrated in FIG. 5), valve element remains partially seated within seat 44 and is also seated within seat 46. Since it extends all of the way across passageway 36, valve element 42 then greatly impedes fluid flow through passageway 36 and thus through piston 14. More specifically, the aforesaid flow is then limited to only such "leakage" flow as is permitted by the preselected small tolerance or slight clearance existing between the confronting peripheral surfaces of element 42 and seats 44, 46. Since this leakage flow is small, the damping coefficient of assembly 10 when valve element 42 occupies its valve-closed position is of relatively large magnitude.

Movement of valve element 42 between its open and closed positions can occur freely even when there is a large difference in pressure of the hydraulic fluid upon the opposite ends of piston 14, and thus within the ports 38 and the ports 40. Such freedom of movement is due in part to pressure equalizing openings 54 that extend through valve element 42 and are aligned with ports 38. Openings 54 ensure that the pressure upon the left and right (as viewed in FIG. 5) surfaces of valve element 42 will be substantially the same at all times. They thus cause the valve to be substantially pressure balanced in the direction of the central axis of assembly 10. In the absence of openings 54 or some comparable pressure-equalizing means, the major surface of valve element 42 confronting seat 46 could be subjected to a much higher fluid pressure than the concave surface thereof confronting the bottom of seat 44. The pressure differential could make it quite difficult, if not impossible, to shift the valve from its illustrated open position to its closed position, and/or to maintain it in its closed position. Openings 54 also facilitate free movement of valve element 42 from its closed position to its illustrated (FIG. 5) open position, by permitting escape of excess fluid from the then diminishing space between the bottom of seat 44 and the confronting left surface of the valve element. The concavity of the aforesaid valve element surface also facilitates the fluid escape.

Pressure balance of valve 42 in its longitudinal direction exists since the dual ports 40 cause the fluid pressure upon the thereto adjacent opposite end surfaces of the valve member to always be the same. It will be noted that this desirable condition would not ensue when the valve element 42 occupied its closed position if there were only a single one of the ports 40. The valve element is also pressure balanced in its width direction since there is no significant difference in the pressures to which the opposite side surfaces of the valve element are subjected in either of the valve positions.

Since valve element 42 is substantially pressure balanced in a plurality of orthogonal directions, the motion imparting actuator 52 connected to its support rod 50 may be and preferably is a relatively low-power linear actuator of a solenoid or similar inexpensive type. Actuator 52 may if desired be of a double-acting type that positively drives valve element 42, via support rod 50, toward both its open position and its closed position.

However, in the illustrated construction of assembly 10, the actuator 52 need only drive the valve element toward its open (FIG. 5) position, since the valve element will automatically assume its closed position when free to do so. The automatic movement of valve element 42 to its closed position is due to the fact that the valve element is not completely force balanced in the axial direction of assembly 10 since the area of its surface confronting seat 46 is less than the area of its surface confronting seat 44 by the cross-sectional area of rod 50. Therefore, even when the fluid pressure upon such surfaces is the same, valve element 42 is subjected to a net rightward (as viewed in FIG. 5) driving force that is at least equal to the pressure of the gas charge in accumulator 26 times the cross-sectional area of rod 50. In a damper assembly of the so-called "high pressure" type, wherein a pressure of as much as 500 psi may be maintained within cylinder 10 at all times, the aforesaid force is sufficient to rapidly move valve element 42 to its closed position, and to there maintain it, when solenoid 52 is not energized.

Increasing the size of passageway 36 and ports 34, 38 permits piston 14 to conduct a greater volume of fluid when the valve therein is open. Additional increase in flow capacity may also be realized by providing one or more additional passageways and/or ports within the piston. This approach is exemplified by the additional embodiments shown in FIGS. 7-12 and 13-18 of the drawings, wherein components similar to those previously described are designated by the same reference numerals with the addition of the suffix number "2" (in the case of the FIGS. 7-12 embodiment) or "3" (FIGS. 13-18 embodiment).

The valve means within the piston 214 of FIGS. 7-12 includes two angularly extending flow passageways 236, two inlet/outlet ports 238, four outlet/inlet ports 240, a movable valve member 242 having valve elements 242' at opposite ends thereof, and two recessed seats 244, 246 for receiving valve member 242. Each flow passageway 236 communicates at each end thereof with one of the ports 240 opening from the left (as viewed in FIGS. 7 and 8) end of piston 214, and communicates at a location centrally of its length with one of the ports 238 opening from the opposite (right, as viewed in FIGS. 7 and 8) end of the piston, valve seats 244, 246 each have at their opposite ends semicircular portions aligned with respective ones of the ports 238, and with respective ones of the valve elements 242' of valve member 242. Each seat 244, 246 further has a central portion extending in opposite radial directions to the opposite end portions of the seat, and adapted to receive the radially extending central section of valve member 242. Each valve element 242' of valve member 242 has a pressure equalizing opening 254 extending therethrough. The surface of valve member 242 confronting seat 244 has concave portions or recesses in its central and opposite sections. Additionally, the central section of the valve member 242 of this embodiment need not and illustratively does not have as close a tolerance with seats 244, 246 as do the valve elements 242' at opposite ends of the valve member.

When valve member 242 occupies its open-valve position shown in FIGS. 10-12, fluid may flow relatively freely between the end ports 240 and the central port 238 communicating with each fluid passageway 236, since the valve elements 242' at the opposite ends of valve member 242 do not then obstruct fluid flow through the passageways. However, when valve element 242 occupies its valve-off position (not shown, but to the right of the valve position shown in FIG. 11), its semi-circular valve elements 242' are seated within the similarly shaped end portions of seat 246, while at the same time remaining partially seated within the semi-circular end portions of seat 244. This obstructs all but leakage flow through the central portion of each passageway 236, as a consequence of which the damping coefficient of the assembly is of a relatively large magnitude determined by the preselected tolerance between elements 242' and the end portions of seat 246.

As in the case of the first embodiment of FIGS. 2-6, the valve member 242 is substantially pressure balanced in a plurality of orthogonal directions, including the axial direction of assembly 10 and the length direction of member 242. In the latter connection, it will be noted that while the pressure of the fluid in each passageway 236 upon the associated one of the valve elements 242' will produce a force tending to displace valve member 242 in a longitudinal direction, this force will be counteracted by the force similarly and simultaneously imposed upon the other valve element 242' and tending to displace valve member 242 in the opposite longitudinal direction.

In the third embodiment illustrated in FIGS. 13-18 of the drawings, the valve means within piston 314 includes three sequentially interconnected fluid passageways 336, three fluid inlet/outlet ports 338, three fluid outlet/inlet ports 340, a movable valve member 342 having three semicircular valve elements 342' at the ends of corresponding ones of three radially extending and equally spaced spoke-like sections thereof, and a pair of valve seats 344, 346 for receiving valve member 342. Each passageway 336 communicates at each end thereof with an associated one of the three left-end piston ports 340, which port is also in "shared" communication with the next adjacent one of the interconnected passageways 336. Centrally of its length, each passageway 336 also communicates with an associated one of the three right-end piston ports 338, valve member 342 has pressure-equalizing openings 354 extending through its valve elements 342', and has recessed or concave lower surface portions confronting seat 344. The tolerance between valve elements 342' and the portions of seats 344, 346 that receive them is of a preselected small magnitude that determines the magnitude of the larger damping coefficient of the damper assembly.

In the "closed" position thereof illustrated in FIGS. 16-18, valve member 342 is so fully seated within seat 344 that its valve elements 342' do not significantly obstruct the flow of fluid through each passageways 336 between its associated pots 338, 340. The damping coefficient of the damper assembly is then relatively low. When valve member 342 occupies its closed position (not shown in the drawings, but wherein its valve elements 342' are received within both seats 344, 346), the fluid flow through each passageway 336 between its ports 338, 340 is limited to "leakage." The damping coefficient of the assembly incorporating piston 314 is therefore then relatively large. As in the preceding embodiments, the valve member 58 is pressure balanced in a plurality of orthogonal directions.

The number of valve elements provided in the piston may of course be more tan three, if additional ones should be desired.

In addition to being extremely fast-acting, durable, compact and inexpensive, it will be apparent that valve means in accordance with the present invention is capable of conducting flows that are large in relation to the overall size of the piston in which the valve means is contained.

While illustrative embodiments of the invention have been shown and described, this was for purposes of illustration only, and not for purposes of limitation, the scope of the invention being in accordance with the following claims.

I claim:

1. In a controllable fluid damper assembly of the type having a cylinder, a piston mounted within said cylinder for reciprocatory movement along the central axis of said assembly, said piston having a peripheral side wall closely adjacent the inner surface of said cylinder and having opposite ends facing respective ones of the opposite ends of said cylinder, and a piston rod connected to one of said opposite ends of said piston and extending from an end of said cylinder, the improvement comprising:

said piston having therewithin
  (a) at least one elongated fluid passageway having opposite sides, said passageway extending transversely of said central axis of said assembly and having terminal opposite end portions adjacent to and spaced inwardly from said peripheral side wall of said piston;
  (b) fluid inlet/outlet ports opening from one of said ends of said piston and extending to and communicating with respective ones of said opposite end portions of said passageway;
  (c) an outlet/inlet port opening from the other one of said opposite ends of said piston and communicating with said passageway at a location along the length thereof intermediate said opposite end portions of said passageway and spaced from said inlet/outlet ports;
  (d) a pair of valve seats located upon and recessed within opposite sides of said passageway intermediate the length thereof, said valve seats being in spaced confronting relationship to each other;

valve means for controlling fluid flow through said passageway, said valve means including a valve element mounted within said passageway for movement transversely thereof between said valve seats and between an open-valve position and a closed-valve position, said valve element when in said open-valve position being received by one of said seats and spaced from the other of said seats and permitting relatively free flow of fluid through said passageway between said inlet/outlet ports and said outlet/inlet ports, and said valve element when in said closed-valve position thereof extending between and being received by both of said valve seats and obstructing flow of fluid through said passageway between said inlet/outlet ports and said outlet/inlet port;

said valve element being substantially pressure-balanced in orthogonal directions, having opposite major surfaces extending transversely of said axis of said assembly and confronting respective ones of said valve seats, and having pressure-equalizing opening means extending between and opening from said surfaces for substantially equalizing fluid pressures upon said valve element surfaces;

and powered actuator means for controlling said movement of said valve element.

2. A damper assembly as in claim 1, wherein one of said surfaces of said valve elements has a concave portion.

3. A damper assembly as in claim 2, wherein one of said valve seats has an imperforated inner surface, and said one of said valve element surfaces confronts said imperforate surface of said one of said valve seats.

4. A damper assembly as in claim 1, wherein said fluid inlet/outlet ports and outlet/inlet ports are substantially parallel to said central axis of said assembly.

5. A damper assembly as in claim 1, wherein said passageway is one of a plurality of substantially identical passageways, said passageways being disposed in symmetrical relationship about said central axis of said assembly, and said valve element is one of a plurality of valve elements of said valve means, said valve elements being associated with respective ones of said passageways.

6. A damper assembly as in claim 5, wherein said passageways are spaced from one another.

7. A damper assembly as in claim 5, wherein said passageways are sequentially interconnected with each other and each of said inlet/outlet ports communicates with and is adjacent an end portion of two of said passageways.

* * * * *